(12) United States Patent
Zi et al.

(10) Patent No.: US 11,109,462 B2
(45) Date of Patent: Aug. 31, 2021

(54) BACKLIGHT, CONTROL METHOD FOR BACKLIGHT, AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Feng Zi, Beijing (CN); Jian Sun, Beijing (CN); Ziqiang Guo, Beijing (CN); Jiyang Shao, Beijing (CN); Xinjian Liu, Beijing (CN); Feng Pan, Beijing (CN); Yakun Wang, Beijing (CN); Binhua Sun, Beijing (CN); Hao Zhang, Beijing (CN); Lili Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/630,573

(22) PCT Filed: May 13, 2019

(86) PCT No.: PCT/CN2019/086682
§ 371 (c)(1),
(2) Date: Jan. 13, 2020

(87) PCT Pub. No.: WO2019/218974
PCT Pub. Date: Nov. 21, 2019

(65) Prior Publication Data
US 2021/0084727 A1 Mar. 18, 2021

(30) Foreign Application Priority Data

May 18, 2018 (CN) .......................... 201810481749.0

(51) Int. Cl.
*H05B 45/37* (2020.01)
*H05B 45/46* (2020.01)
(Continued)

(52) U.S. Cl.
CPC ....... *H05B 45/46* (2020.01); *G02F 1/133603* (2013.01); *H05B 45/37* (2020.01); *G02F 1/133612* (2021.01)

(58) Field of Classification Search
None
See application file for complete search history.

(56) References Cited

U.S. PATENT DOCUMENTS

| 7,535,183 B2 * | 5/2009 | Gurr | ...................... H05B 45/20 315/247 |
| 2007/0030241 A1* | 2/2007 | Adachi | ................ G09G 3/3406 345/102 |
| 2007/0159434 A1* | 7/2007 | Yen | ........................ H05B 45/37 345/92 |

FOREIGN PATENT DOCUMENTS

| CN | 207219102 U | 4/2018 |
| CN | 108882442 A | 11/2018 |

OTHER PUBLICATIONS

International Search Report of PCT/CN2019/086682 in Chinese, dated Aug. 19, 2019, with English translation.

* cited by examiner

*Primary Examiner* — Anh Q Tran
(74) *Attorney, Agent, or Firm* — Collard & Roe, P.C.

(57) ABSTRACT

A backlight, a control method of the backlight, and a display device are provided. The backlight includes a plurality of light-emitting modules arranged in an array. Each of the light-emitting modules includes a light-emitting unit and a control circuit. The control circuit includes n branches, a controller, and a current module. Each branch of the n (Continued)

branches is connected in series with the light-emitting unit and the current module. Each branch is provided with a switch, and the controller is separately connected to the switch on each branch.

13 Claims, 2 Drawing Sheets

(51) Int. Cl.
*G02F 1/13357* (2006.01)
*G02F 1/1335* (2006.01)

BACKLIGHT, CONTROL METHOD FOR BACKLIGHT, AND DISPLAY DEVICE

CROSS-REFERENCE TO RELATED APPLICATIONS

This application is the National Stage of PCT/CN2019/086682 filed on May 13, 2019, which claims priority under 35 U.S.C. 0.5119 of Chinese Application No. 201810481749.0 filed on May 18, 2018, the disclosure of which is incorporated by reference.

TECHNICAL FIELD

Embodiments of the present disclosure relate to a backlight, a control method thereof and a display device.

BACKGROUND

With the development of display technologies, a growing number of display panels may display images with a high-dynamic range (HDR), which, in comparison with common images, may provide a wider luminance range (i.e. a high-dynamic range) to enable the display panels to have the capability of presenting fine images.

SUMMARY

Embodiments of the present disclosure provide a backlight, a control method thereof and a display device.

At least one embodiment of the present disclosure provides a backlight, comprising: a plurality of light-emitting modules arranged in an array, each of the light-emitting modules comprising a light-emitting unit and a control circuit, the control circuit comprising n branches, a controller and a current module, each of the n branches, the light-emitting unit and the current module being connected in series, each of the n branches provided with a switch, the controller being connected with the switch on each of the branches and configured to control the switch on each of the branches to be turned on or turn off, and the current module being configured to be connected with a power supply. Each of the n branches corresponds to a different amplitude of current, and when the switch of any one of the n branches is turned on under the control the controller, the current module inputs to a corresponding branch with a current of a given amplitude, where n is an integer equal to or larger than 2.

For example, the light-emitting unit comprises at least one light-emitting diode.

For example, the current module comprises a constant current source circuit.

For example, the controller is connected with the constant current source circuit through a control line, and is configured to control the constant current source circuit and to regulate the amplitude of current corresponding to each of the n branches.

For example, the control circuit further comprises a digital-to-analog converter disposed on the control line, and the digital-to-analog converter is configured to convert digital signals output by the controller into analog signals and input the analog signals into the constant current source circuit.

For example, the switch on each of the branches is a switch triode with its base connected with the controller.

For example, the controller is a micro-control unit.

At least one embodiment also provides a display device comprising a display panel and the backlight.

At least one embodiment also provides a method of controlling a backlight used to control the controller of the backlight, comprising: acquiring a control signal by the controller; and controlling the switches on the n branches by the controller to turn on the branch as instructed by the control signal to be turned on.

For example, the current module comprises a constant current source circuit, the controller being connected with the constant current source circuit via a control line, the method further comprising: controlling the constant current source circuit by the controller to regulate the current amplitude corresponding to each of the n branches.

BRIEF DESCRIPTION OF THE DRAWINGS

Embodiments of the present disclosure will be described in more detail below with reference to accompanying drawings to allow an ordinary skill in the art to more clearly understand embodiments of the present disclosure, in which.

DETAILED DESCRIPTION

Figure 1:
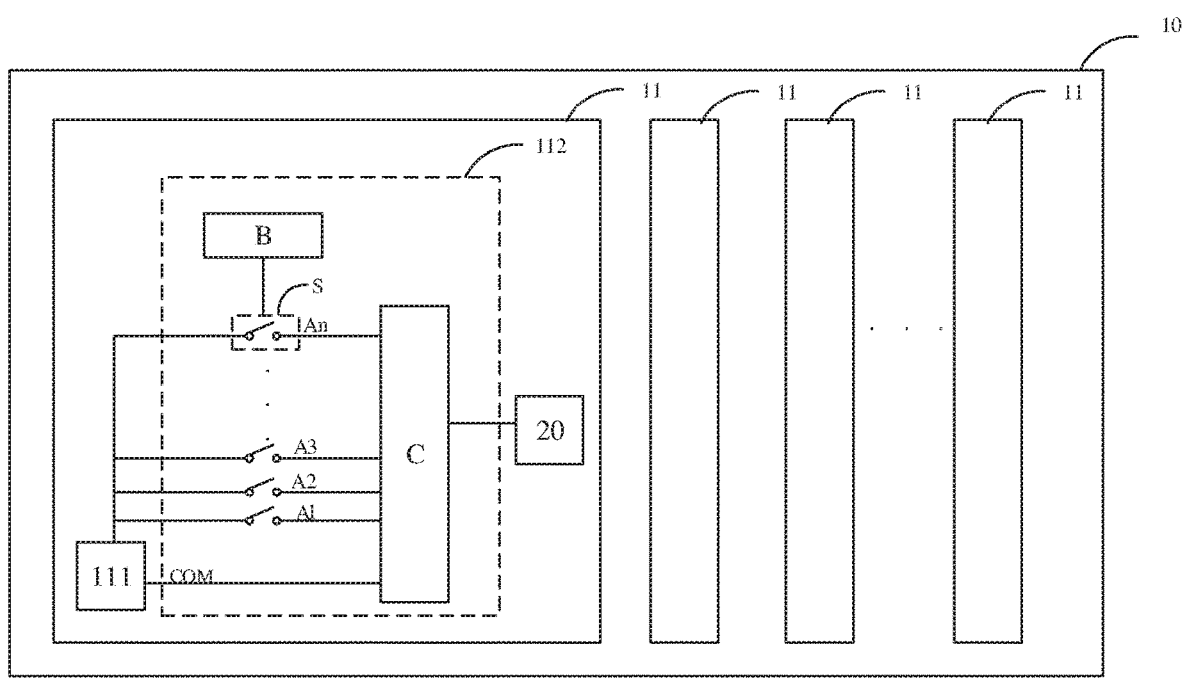
FIG. 1 is a structural diagram of a backlight provided in an embodiment of the present sure.

Technical solutions of the embodiments will be described in a clearly and completely way in connection with the drawings related to the embodiments of the disclosure. Apparently, the described embodiments are just a part but not all of the embodiments of the disclosure. Based on the described embodiments herein, one of ordinary skill in the art can obtain other embodiment(s), without any creative labor, which shall be within the scope of the present disclosure.

Unless otherwise defined, all the technical and scientific terms used herein have the same meanings as commonly understood by one of ordinary skill in the art to which the present disclosure belongs. The terms, such as 'first,' 'second,' or the like, which are used in the description and the claims of the present disclosure, are not intended to indicate any sequence, amount or importance, but for distinguishing various components. The terms, such as 'comprise/comprising,' 'include/including,' or the like are intended to specify that the elements or the objects stated before these terms encompass the elements or the objects and equivalents thereof listed after these terms, but not exclude other elements or objects. The terms, 'on,' 'under,' or the like are only used to indicate relative position relationship, and when the absolute position of the object which is described is changed, the relative position relationship may be changed accordingly.

The backlight of a display device in the present disclosure is equipped with a large number of light-emitting diodes (LEDs), each of which provides backlight for a preset display region of a display panel. By controlling the amount of the activated LEDs in each region, the luminance of the region may be regulated; that is to say, the higher the luminance of a region is, the more the amount of the activated LEDs in the region is, and the lower the luminance of a region is, the less the amount of the activated LEDs in the region is. In this way, the brightness range of the backlight may be enhanced, the luminance range of images presented by the display panel may be enhanced and images with a high-dynamic range may be displayed.

However, the inventor has noticed that if the LEDs in the backlight of the display device have to be activated or deactivated frequently to provide effect of bright or dark of different images, the display device will have higher power consumption.

The backlight enabling the display device to display high-dynamic range (HDR) images is one capable of dynamic partitioning. The backlight may be divided into different regions, each of which provides a backlight source for a give display region. The luminance of each region may be regulated independently. In related technologies, the backlight of a display device may be provided with a large number of LEDs and the luminance of each display region ay be regulated by controlling the amount of the activated LEDs in each region. When the display device displays a plurality of frames continuously, in order for the plurality of frames to exhibit an HDR effect, the display device needs to activate and deactivate a corresponding amount of LEDs frequently, and may have high power consumption for frequent activation of a large number of LEDs as activation of an LED having considerable power consumption.

An embodiments of the present disclosure provides a backlight that may resolve the problem of high power consumption of a display device.

FIG. 1 is a structural diagram of a backlight 10 in an embodiment of the present disclosure. The backlight 10 includes a plurality of light-emitting modules 11 arranged in an array, each of which includes a light-emitting unit 111 and a control circuit 112. Each light-emitting unit 111 may provide backlight for a given display region in a display device, and may achieve dynamic partitioning of the backlight by regulating the brightness of each light-emitting unit 111. For example, the light-emitting 111 may include at least one LED. In addition, the light-emitting unit 111 may further include cold cathode fluorescent lamps (CCFLs), organic light-emitting diodes (OLEDs) or the like, but embodiments of the present disclosure are not limited thereto.

The control circuit 112 may include n branches (branches A1 to An as shown in FIG. 1), a controller B and a current module C, where n is an integer equal to or larger than 2. The n branches A1 to An, the light-emitting unit 111 and the current module C are connected in series. Each of the branches is provided with a switch 5, which is connected with the controller B. Exemplarily, FIG. 1 only shows that the controller B is connected with the switch S of the branch An, while the switches on other branches have the same design and connection as on the branch An. The controller B is configured to control the switch S on each branch to turn on and turn off, that is, one controller controls a plurality of control channels, each of which includes a control switch disposed thereon. The current module C is connected with a power supply 20. For example, each branch of the n branches may correspond to a current of different amplitude. When the switch S on any one of the n branches is turned on under the control of the controller B, the current module C can input the branch with a current of an amplitude corresponding to the branch. For example, when the switch S on the branch A3 is controlled to be turned on and the n−1 branches of the n branches other than the branch A3 are controlled to be turned off by the controller B, the current module C can input the branch A3 with a current of an amplitude corresponding to the branch A3. The light-emitting unit may be driven by current with different amplitudes to emit backlight with different brightness, bright effect or dark effect of the images may be achieved by outputting current with different amplitudes.

The backlight provided in the embodiment of the present disclosure includes a plurality of light-emitting modules, each of which includes light-emitting unit(s) connected with the control circuit including n branches. Each of the n branches corresponds to a different amplitude of current and current input into each light-emitting unit is controlled by controlling the "switching on" of the n branches, so that the light-emitting unit is controlled to emit light with different brightness without turning on and turning off of each LED frequently. In this way, the high power consumption of the display device is avoided to enhance the luminance range of images presented by the display panel by turning on or turning off each LED frequently. In this way, Energy is saved. Moreover, the life of an LED may be reduced due to being turned on or turned off frequently. So, the backlight provided by the embodiments of the present disclosure can increase service life of the light-emitting unit.

Furthermore, in the backlight provided by the embodiment of the present disclosure, the control circuit may output current with a given amplitude under the control from the controller, improving response speed of brightness regulation of the backlight; and in the backlight provided by the embodiment of the present disclosure, each light-emitting unit may be input current with different amplitudes by the circuit module and thus present different brightness, so that the display device may present finer images. In this way, the following problems are avoided: to meet requirements about size and image brightness of different display devices, each of the backlights of the display devices is provided with a plurality of driving integrated circuits, each of which corresponds to a group of LEDs, and each group of LEDs are turned on or turn off by controlling the voltage output to the group of LEDs by the driving integrated circuit; response of the LEDs may be slowed down due to controlling the driving integrated circuit to turn on and turn off each group of LEDs and the complexity of the driving integrated circuit is greatly increased; and each of the LEDs in the backlight only have two different states, i.e. 'on' or 'off', when the backlight can only present different brightness by controlling the amount of the activated LEDs or deactivated LEDs.

Figure 2:
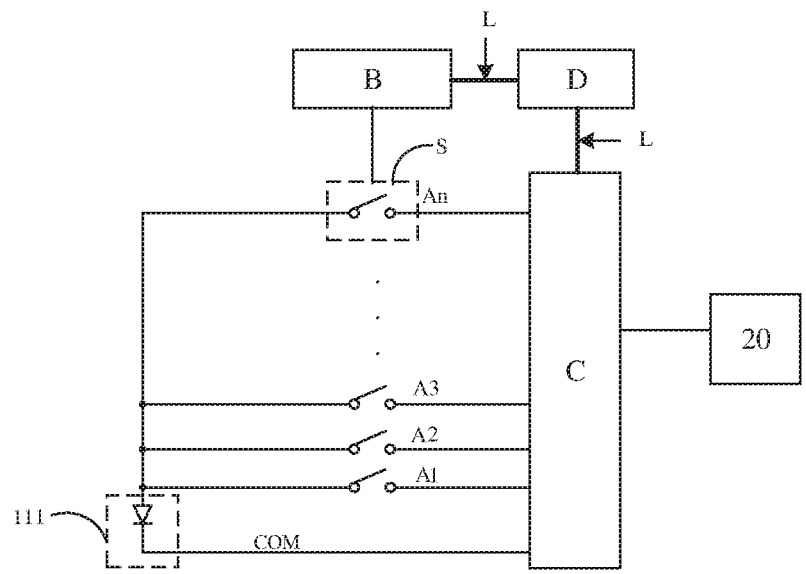
FIG. 2 is a structural diagram of a light-emitting module provided in an embodiment of the present disclosure.

For example, FIG. 2 shows an example, in which the light-emitting unit 111 in the light-emitting module 11 includes one light-emitting diode (LED), but embodiments of the present disclosure are not limited thereto. In other possible embodiments, the light-emitting unit 111 may include a plurality of LEDs connected in parallel.

For example, the current module C may include a constant current source circuit that may output a constant current under a given voltage as used in conventional technologies. The controller B may be connected with the constant current source circuit via a control line L. The controller B is configured to control the constant current source circuit through the control line L to regulate the amplitude of the current corresponding to each branch of the n branches. In an embodiment of the present disclosure, the controller B may obtain a brightness the display area corresponding to the light-emitting unit 111 controlled by the controller B requires to display images and controls the switch on the corresponding branch to be turned on based on the amplitude of the current corresponding to the brightness, so that the light with the corresponding brightness may be emitted by the light-emitting unit 111 driven by the current. For example, the controller B may be a micro-control unit (MCU).

For example, since signals output by the controller B are digital signals and the constant current source circuit usually receives analog signals, to convert the digital signals output by the controller B into analog signals received by the constant current source circuit, as shown in FIG. 2, the control circuit 112 may further include a digital-to-analog converter D disposed on the control line L. The digital-to-analog converter D is configured to convert the digital signals into analog signals and the analog signals is input into the constant current source circuit. The constant current source circuit can output current with amplitudes corresponding to the analog signals, after the constant current source circuit receives the analog signals.

In the backlight provided in an embodiment of the present disclosure, the controller B can control the switches on the n branches and regulate the amplitude of current corresponding to each branch. By regulating the amplitude of the current corresponding to each branch, the brightness range of the light that can be emitted by each light-emitting unit 111 may be enhanced. Exemplarily, when the overall luminance of the images to be displayed by the display device is relatively low, the controller may decrease the amplitude of the current as a whole corresponding to the n branches, so that the brightness corresponding to the current of each set of n branches distributes in a range of lower level; when the overall luminance of the images to be displayed by the display device is relatively high, the controller may increase the amplitude of the current as a whole corresponding to the n branches, so that the brightness corresponding to the current of each branch distributes in a range of higher level. In this way, the brightness range of the light that can be emitted by the light-emitting unit covers the lower level range and the higher level range and thus is substantially enhanced.

For example, the switch on each branch A may be a switch triode with its base connected with the controller B. The switch triode on each branch may be controlled to be turned on or turned off by the controller B transmitting control signals, which are digital signals, to the switch triode on each branch. For example, the controller is programmable and can be programmed to have the control function, so that the controller can send control by the embodiment of the present disclosure may realize digitalized control of the amplitude of the current input into each light-emitting unit and digitalized regulation of brightness of light emitted by each light-emitting unit. For example, in the backlight provided in the embodiment of the present disclosure, the controller B may control the switches on the n branches and the constant current source circuit under the control of the controller in the display device. The controller in the display device may include one or more central processing units (CPUs).

The controller in the backlight provided by embodiments of the present disclosure may choose the ones of the n branches with low amplitudes of the brightness and close to each other to output current in accordance to the brightness, so that the light-emitting units need not to be turned off and thus power consumption for reactivating the LEDs upon image switching is avoided, which also decreases the heat generated by activating the LEDs. As a result, the backlight efficiency is improved, power consumption is reduced and meanwhile the service life of the light-emitting units is increased. Furthermore, the following operations may be eliminated: when an image with rather low brightness is to be displayed by a display area of a display device, the controller of the display device sends a control signal corresponding to the image brightness to the controller of the backlight and then the controller of the backlight turns off the LEDs corresponding to the display area.

The backlight provided by embodiments of the present disclosure include a plurality of light-emitting modules, each of which includes a light-emitting unit connected with a control circuit including n branches. Each of the n branches corresponds to current with a different amplitude and current input into each light-emitting unit is controlled by controlling the switches on the n branches, so that each light-emitting unit is controlled to emit light with different brightness without turtling on or turning off each LED frequently. In this way, high power consumption of the display device is avoided due to enhancing the luminance range of images presented by the display panel by turning on or turning off each LED frequently, so that the energy is saved.

Figure 3:
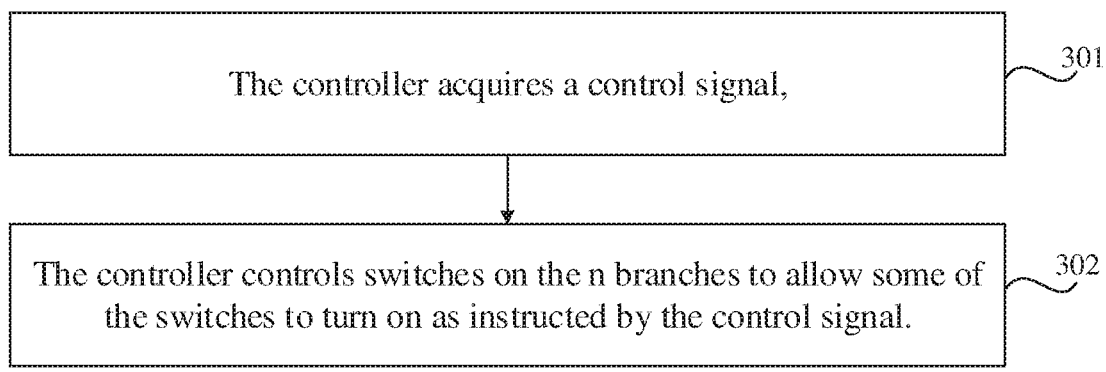
FIG. 3 is a flowchart of a method of controlling a backlight provided in an embodiment of the present disclosure.

Refer to FIG. 3, which illustrates a flowchart of a method of controlling a backlight provided in an embodiment of the present disclosure. The method is applicable to the backlights in the embodiments described above and includes the following operations.

In step 301, a controller acquires a control signal.

For example, the control signal may control the brightness of light required by the image to be displayed and emitted by the light-emitting unit in the backlight. For example, the control signal may be sent by the controller of the display device.

In step 302: the controller controls switches on the n branches and turns on the one of the switches as instructed by the control signal to be turned on.

For example, the current module includes a constant current source circuit, step 302 may include regulating the amplitude of current corresponding to each of the n branches by the controller controlling the constant current source circuit.

Under the control of the controller of the display device, the controller may control die constant current source circuit to regulate the amplitude of current corresponding to each of the n branches, so that the brightness range of the light emitted by the light-emitting units may be enhanced.

Steps 301 and 302 illustrate a way in which any one of the light-emitting units of the backlight may be controlled in brightness. In this way, the brightness of the light emitted by each of the light-emitting units may be controlled.

In the method of controlling a backlight provided in the embodiments of the present disclosure, current input into each of the light-emitting units is controlled by the controller controlling switches on the n branches so as to control the brightness of the light emitted by the light-emitting unit. In this way, there is no need for the LEDs to be turned on or turned off frequently, the problem of high power consumption of the display device is avoided, which may otherwise caused by turning on or turning off each LED frequently to enhance the luminance range of images presented by the display panel, and the energy is saved.

One of ordinary skill in the art can understand clearly that, for convenience and brevity of description, for other characteristics of the above-mentioned method, corresponding description about the foregoing backlight embodiments may be referred to, and will not be repeated here.

An embodiment of the present disclosure also provides a display device including a display panel and the backlight described in the embodiments above.

The display device may include cellphones, TV sets, displays, tablets, or other various products with a display function. The display panel may be a passive one requiring a backlight, for example, a liquid crystal display panel.

The following points should be noted.

(1) The accompanying drawings involve only the structure(s) in connection with the embodiment(s) of the present disclosure, and other structures) can be referred to common design(s).

(2) Without conflict with each other, embodiments and features in embodiments of the present disclosure can be combined to obtain new embodiment(s), the new embodiment(s) should fall in the scope of the present disclosure.

The above description is only the exemplary embodiments of the present disclosure, which is not intended to limit the scope of the present disclosure. Without departing from the spirit and principle of the present disclosure, any changes, equivalent substitution, and modifications etc. shall belong to the scope of the present disclosure.

What is claimed is:

1. A backlight, comprising:
a plurality of light-emitting modules arranged in an array, each of the light-emitting modules comprising a light-emitting unit and a control circuit, the control circuit comprising n branches, a controller, and a current module, each of the n branches, the light-emitting unit, and the current module being connected in series, each of the n branches provided with a switch, the controller being connected with the switch on each of the branches and configured to control the switch on each of the branches to be turned on or turn off, and the current module being configured to be connected with a power supply;
wherein each of the n branches corresponds to a different amplitude of current, and when the switch of any one of the n branches is turned on under the control of the controller, the current module inputs to a corresponding branch with a current of a given amplitude, where n is an integer equal to or larger than 2,
wherein the current module comprises a constant current source circuit,
the control circuit further comprises a digital-to-analog converter disposed on the control line, and
the digital-to-analog converter is configured to convert digital signals output by the controller into analog signals and input the analog signals into the constant current source circuit.

2. The backlight according to claim 1, wherein the light-emitting unit comprises at least one light-emitting diode.

3. The backlight according to claim 1, wherein the controller is connected with the constant current source circuit through a control line, and is configured to control the constant current source circuit and to regulate the amplitude of current corresponding to each of the n branches.

4. The backlight according to claim 1, wherein the switch on each of the branches is a switch triode with its base connected with the controller.

5. The backlight according to claim 1, wherein the controller is a micro-control unit.

6. A display device comprising a display panel and a backlight, wherein the backlight comprise:
a plurality of light-emitting modules arranged in an array, each of the light-emitting modules comprising a light-emitting unit and a control circuit, the control circuit comprising n branches, a controller and a current module, each of the n branches, the light-emitting unit and the current module being connected in series, each of the n branches provided with a switch, the controller being connected with the switch on each of the branches and configured to control the switch on each of the branches to be turned on or turn off, and the current module being configured to be connected with a power supply;
wherein each of the n branches corresponds to a different amplitude of current, and when the switch of any one of the n branches is turned on under the control of the controller, the current module inputs to a corresponding branch with a current of a given amplitude, where n is an integer equal to or larger than 2,
wherein the current module comprises a constant current source circuit,
the control circuit further comprises a digital-to-analog converter disposed on the control line, and
the digital-to-analog converter is configured to convert digital signals output by the controller into analog signals and input the analog signals into the constant current source circuit.

7. A method of controlling a backlight used to control a controller of a backlight, wherein the backlight comprises:
a plurality of light-emitting modules arranged in an array, each of the light-emitting modules comprising a light-emitting unit and a control circuit, the control circuit comprising n branches, a controller and a current module, each of the n branches, the light-emitting unit and the current module being connected in series, each of the n branches provided with a switch, the controller being connected with the switch on each of the branches and configured to control the switch on each of the branches to be turned on or turn off, and the current module being configured to be connected with a power supply;
wherein each of the n branches corresponds to a different amplitude of current, and when the switch of any one of the n branches is turned on under the control of the controller, the current module inputs to a corresponding branch with a current of a given amplitude, where n is an integer equal to or larger than 2,
wherein the current module comprises a constant current source circuit,
the control circuit further comprises a digital-to-analog converter disposed on the control line, and
the digital-to-analog converter is configured to convert digital signals output by the controller into analog signals and input the analog signals into the constant current source circuit; and wherein the method comprises:
acquiring a control signal by the controller; and
controlling the switches on the n branches by the controller to turn on the branch as indicated by the control signal to be turned on.

8. The method according to claim 7, wherein the current module comprises a constant current source circuit, the controller being connected with the constant current source circuit via a control line, the method further comprising:
controlling the constant current source circuit by the controller to regulate the current amplitude corresponding to each of the n branches.

9. The backlight according to claim 1, wherein the controller is connected with the constant current source circuit through a control line, and is configured to control the constant current source circuit and to regulate the amplitude of current corresponding to each of the n branches.

10. The display device according to claim 6, wherein the light-emitting unit comprises at least one light-emitting diode.

11. The display device according to claim 6, wherein the controller is connected with the constant current source circuit through a control line, and is configured to control the constant current source circuit and to regulate the amplitude of current corresponding to each of the n branches.

12. The display device according to claim 6, wherein the controller is connected with the constant current source circuit through a control line, and is configured to control the constant current source circuit and to regulate the amplitude of current corresponding to each of the n branches.

13. The display device according to claim 6, wherein the controller is a micro-control unit.

* * * * *